Sept. 30, 1969  E. H. BERRY ET AL  3,470,443
POSITIVE DC TO NEGATIVE DC CONVERTER
Filed Dec. 7, 1967

EUGENE H. BERRY,
FRANK J. NOLA,
INVENTOR.(S)

BY

ATTORNEYS

United States Patent Office 3,470,443
Patented Sept. 30, 1969

3,470,443
POSITIVE DC TO NEGATIVE DC CONVERTER
Eugene H. Berry, Arab, and Frank J. Nola, Huntsville, Ala., assignors to the United States of America as represented by the Administrator of the National Aeronautics and Space Administration
Filed Dec. 7, 1967, Ser. No. 688,807
Int. Cl. H02m 3/22, 3/08
U.S. Cl. 321—2
3 Claims

ABSTRACT OF THE DISCLOSURE

An apparatus for converting the output of a positive DC voltage source to a negative DC voltage of lower magnitude across a load having a common reference point with the source where a pluraliy of capacitors are charged in series and discharged in parallel. Half wave rectifier means connecting the plurality of capacitors in series and in parallel and first and second transistor switches extending between the positive terminal of the DC source and ground for alternately connecting one end of the capacitance circuit to the positive terminal of the DC source and ground. Unidirectional conducting means connecting the opposed end of the capacitance circuit to ground and to the load so as to steer the charging current to ground and to steer the discharging current through the load.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to voltage conversion and more particularly to devices for converting positive direct current voltage to negative direct current voltage of lower amplitude.

In many applications there exists the need for changing the magnitude and polarity of a positive direct current voltage source to obtain a negative secondary source that is referenced to the same ground as the primary source. For example, in spacecraft vehicle installations it is generally necessary to step down the 28 volt direct current source usually installed therein to obtain a low level negative power supply to power operational amplifiers. Also because of the common use of direct coupled circuitry in operational amplifiers a common reference point between the positive DC source and the negative secondary source is required. The usual method is to use a DC to AC converter coupled to a transformer, and a rectifier coupled to the output thereof to provide a direct current output. These devices are quite expensive, bulky and are usually very heavy, all of which limitations are of considerable importance particularly in spacecraft vehicle installations.

Accordingly, one of the objects of this invention is to provide apparatus for changing the magnitude and polarity of a direct current voltage without the use of transformers.

Another object of this invention is to obtain a secondary source of power wherein the secondary source has a common reference point with the primary source.

SUMMARY OF THE INVENTION

According to the present invention it has been found that a positive to negative DC converter can be made which has none of the aforementioned shortcoming by employing a plurality of capacitors that are adapted to be alternately charged by a DC source while in series and discharged to a load having a common ground with the DC source while in parallel. The use of a capacitance circuit is made possible by the novel technique of connecting the capacitors in series and in parallel by half wave rectifier means so as to provide a common point that may be alternately connected to the positive terminal of the DC source and ground. This technique coupled with the use of half wave rectifiers for steering the capacitor charging current to ground and for steering the capacitor discharge current to the load permits the development of a negative voltage across the load that is referenced to the same ground as the DC source.

DESCRIPTION OF THE DRAWINGS

The invention, both as to its organization and operation together with further objects and advantages thereof may best be understood by reference to the following description taken in accordance with the accompanying drawing in which.

DESCRIPTION OF THE EMBODIMENT

Figure 1:
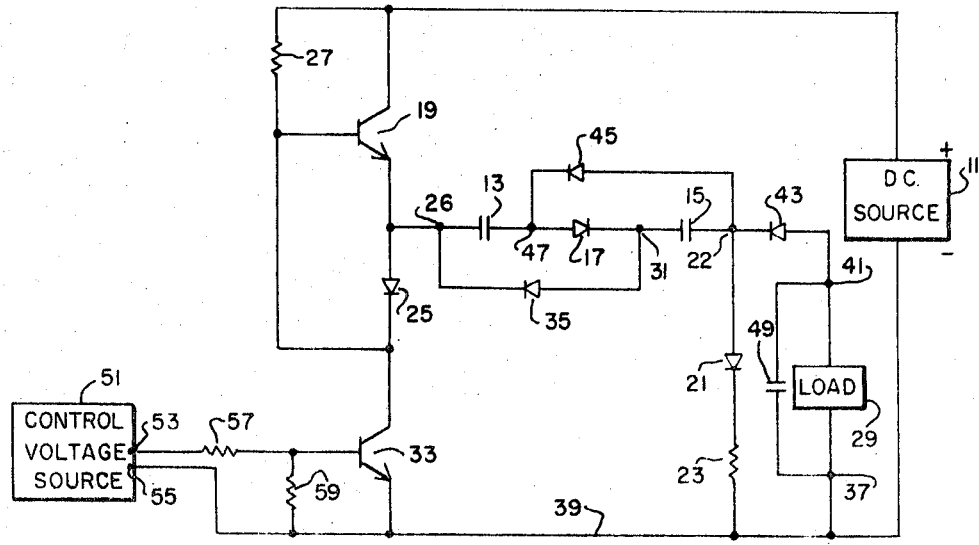
FIGURE 1 is a schematic representation of one embodiment of the invention.

In FIGURE 1 there is shown a source of direct current 11, the output voltage of which is to be converted to a different magnitude and polarity. A pair of equal capacitance electrical capacitors 13 and 15 connected in series by half wave rectifier 17, are connected across the terminals of source 11 by means of NPN transistor 19, half wave rectifier 21 and current limiting resistor 23. The collector of transistor 19 is connected to the positive terminal of source 11 and the emitter of transistor 19 is connected to terminal 26 of capacitor 13 and to the anode of half wave rectifier 25. The base of transistor 19 is connected to the positive terminal of the voltage source 11 by resistor 27 and is also connected to the cathode of rectifier 25. Terminal 22 of capacitor 15 is coupled to the anode of rectifier 21 while the cathode of rectifier 21 is coupled to the negative terminal of the source 11 by resistor 23 and lead 39.

To provide means for connecting capacitor 13 and 15 in parallel configuration with the load 29, half wave rectifiers 35 and 45 are provided. Terminal 31 of capacitor 15 is connected to terminal 26 of capacitor 13 by rectifier 35 and terminal 22 of capacitor 15 is connected to terminal 47 of capacitor 13 by rectifier 45. Terminal 26 of capacitor 13 is connected to the collector of NPN transistor 33 by rectifier 25 while the emitter of transistor 33 is connected to terminal 37 of load 29 and to the negative terminal of the DC source 11 by lead 39. A filter capacitor 49 is connected across the load terminals 37 and 41 and terminal 41 is connected to the anode of rectifier 43. The cathode of rectifier 43 is connected to junction 22 of capacitor 15.

To control the conduction of transistor switches 19 and 33, a reversible polarity control voltage source 51, such as a sine wave generator, is provided. The voltage appearing across the output terminals 53 and 55 of the control voltage source is applied across the serial connection of resistors 57 and 59. The midpoint of resistors 57 and 59 is connected to the base of transistor 33 and output terminal 55 of the control voltage source 51 is connected to the emitter of transistor 33 by lead 39.

Transistors 19 and 23 are operated in either the fully on or fully off condition, synchronized in a 180 degree phase relationship so that when transistor 19 is conducting transistor 33 is nonconductive and when transistor 19 is nonconductive transistor 33 is conductive. In operation on the negative half cycle of the control voltage source 51 terminal 53 will be negative with respect to terminal 55 and a reverse bias will be applied to the emitter-base electrodes of transistor 33 causing transistor 33 to be nonconductive. The potential of the collector electrode of transistor 33 will rise sufficiently to allow emitter-base current to flow in transistor 19, causing transistor to assume a fully on state of conduction and terminal 26 of capacitor 13 will be effectively connected to the positive terminal of the DC source 11.

The capacitors 13 and 15 will thus be charged in series to substantially the output voltage of source 11 through the current path consisting of the collector emitter path of transistor 19, capacitor 13, rectifier 17, capacitor 15, rectifier 21 and current limiting resistor 23 with the voltage across each capacitor equal to one half of the source voltage. It will be understood that resistor 23 is provided to protect transistor 19 and rectifiers 17 and 21 from a current in excess of their rated peak instantaneous current when capacitors 13 and 15 are initially connected across the source in an uncharged state.

On the positive half cycle of the control voltage source 51 terminal 53 will be positive with respect to terminal 55 allowing emitter base current to flow in transistor 33 to switch transistor 33 to a fully on state of conduction. With transistor 33 fully on, transistor 19 will be switched to a fully off state and terminal 26 of capacitor 13 will be disconnected from the positive terminal of the DC source 11 and simultaneously connected to terminal 37 of the load 29 and to the negative terminal of the DC source 11 by lead 39.

Capacitor 13 will thus partially discharge through rectifier 25, the emitter-collector path of transistor 33, lead 39, the load 29, rectifier 43 and rectifier 45 while capacitor 15 will partially discharge through rectifier 35, rectifier 25, the collector emitter path of transistor 33, lead 39, the load 29 and rectifier 43. Since the capacitors 13 and 15 are in parallel connection through rectifiers 45 and 35 while being discharged, the negative output voltage presented to the load is substantially one half the voltage of the source 11. Preferably the switching action of transistors 19 and 33 is at an extremely rapid rate so that capacitor 49 can readily eliminate variations in the voltage across the load produced by the switching action described above.

Figure 2:
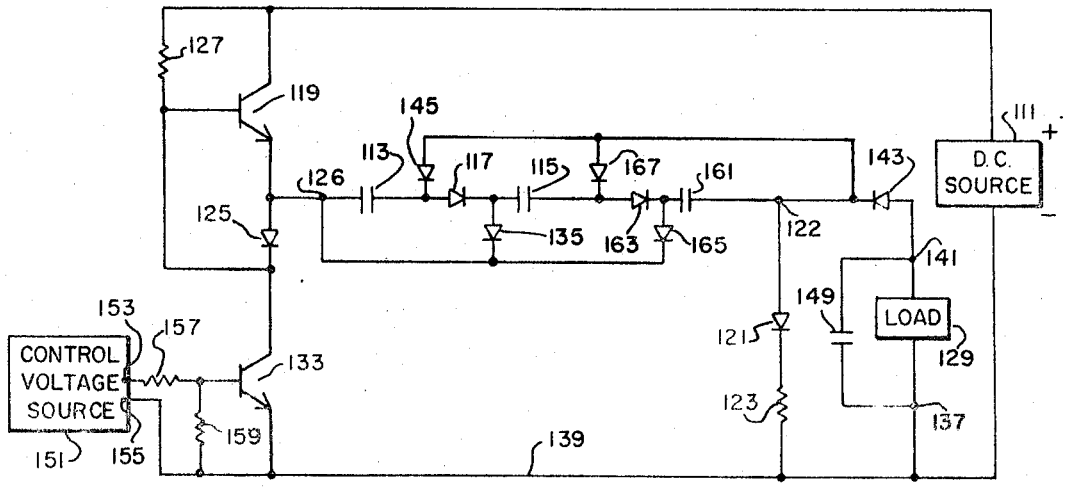
FIGURE 2 is a schematic representation of another embodiment of the invention showing how various ratios of input voltage to output voltage may be achieved.

Manifestly, the addition of additional sections of capacitors and half wave rectifiers will provide conversion ratios proportional to the number of sections added. For example, the embodiment shown in FIGURE 2 illustrates the manner of connection when it is desired to obtain a ratio different from 2:1, in this case the conversion ratio is 3:1. As shown in FIGURE 2, wherein reference numerals having the same last two digits designate identical component parts, an additional capacitor 161 is provided which is connected in series with capacitors 113 and 115 by half wave rectifier 163 and is connected in parallel with capacitors 113 and 115 by rectifiers 165 and 167.

The operation of this embodiment is the same as that of FIGURE 1, the capacitors 113, 115 and 161 being connected in series through rectifiers 117 and 163 when transistor 119 is conducting and transistor 33 is nonconducting and being discharged to the load 129 when transistor 133 is conducting and transistor 119 is nonconductive. A voltage conversion of 3:1 is effected in this manner since the voltage across each of the capacitors is one-third that of the total voltage across the capacitors when they are in series connection.

It will now be seen that the present invention provides very efficient means of converting a positive DC voltage to a negative DC voltage of lower amplitude wherein the second source is referenced to the same point as the primary source. Also, it is seen that the conversion is accomplished without the use of transformers.

The invention is not to be restricted to the specific structural details, arrangement of parts, or circuit connections herein set forth, as various modifications therein may be effected without departing from the spirit and scope of this invention.

What is claimed is:

1. Apparatus for converting a positive direct current voltage to a negative direct current voltage of lower magnitude comprising:
 a plurality of capacitor means;
 first half wave rectifier means connecting said capacitor means in series;
 second half wave rectifier means connecting said capacitor means in parallel;
 a DC source;
 a load having a common reference point with said DC source;
 means coupling said serial connection of capacitor means across said DC source, including third rectifier means and first switch means, for providing a charging current path for said capacitor means;
 means coupling said parallel connection of capacitor means across said load including fourth rectifier means and second switch means for providing a discharging current path for said capacitor means; and
 means actuating said first and second switch means in 180 degree phase relationship.

2. Apparatus for converting a positive direct current voltage to a negative direct current voltage source of lower magnitude comprising:
 a direct current voltage source having positive and negative output terminals;
 a load having first and second input terminals;
 means connecting said first load input terminal to said negative direct current source output terminal;
 a switching terminal;
 a plurality of capacitor means;
 first half wave rectifier means connecting said capacitor means in series;
 second half wave rectifier means connecting said capacitor means in parallel;
 third half wave rectifier means connecting said serial connection of capacitor means between said switching terminal and said negative direct current source output terminal;
 fourth half wave rectifier means connecting said parallel connection of capacitor means between said second load input terminal and said switching terminal; and
 means for effectively transferring the switching terminal back and forth between the positive direct current source output terminal and the first load input terminal to charge said capacitor means through said first and third half rectifier means when the connection of said switching terminal is to the positive direct current output terminal and to discharge the capacitor means through said second and fourth half wave rectifier means when the connection of said switching terminal is to the first load input terminal.

3. The apparatus of claim 2 wherein said last named means includes:

a first transistor switch connecting said switching terminal to said positive direct current output terminal;
a second transistor switch connecting said switching terminal to said first load input terminal; and
control means for driving said first and second transistors alternately between cut-off and saturation in 180 degree relationship to one another.

References Cited

UNITED STATES PATENTS 2,773,200  12/1956  Guggi ------------ 321—15 X

OTHER REFERENCES

Scientific and Technical Aerospace Reports, Capacitive Divider, issue #9, May 8, 1965, p. 1430.

JOHN F. COUCH, Primary Examiner

W. H. BEHA, JR., Assistant Examiner

U.S. Cl. X.R.

307—110, 138; 321—15